J. J. CARNEY.
LUBRICATING DEVICE.
APPLICATION FILED JAN. 4, 1919. RENEWED MAY 3, 1922.

1,434,589.

Patented Nov. 7, 1922.

Inventor
J. J. Carney
By Fetherstonhaugh & Co.
Attys.

Patented Nov. 7, 1922.

1,434,589

UNITED STATES PATENT OFFICE.

JAMES J. CARNEY, OF BETHEL, VERMONT, ASSIGNOR, BY MESNE ASSIGNMENTS, TO T & K INDUSTRIES, LTD., OF MONTREAL, QUEBEC, CANADA, A CORPORATION OF CANADA.

LUBRICATING DEVICE.

Application filed January 4, 1919, Serial No. 269,630. Renewed May 3, 1922. Serial No. 558,276.

*To all whom it may concern:*

Be it known that I, JAMES J. CARNEY, a citizen of the United States, and resident of Bethel, in the State of Vermont, in the United States of America, have invented certain new and useful Improvements in Lubricating Devices, of which the following is a full, clear, and exact description.

This invention relates to improvements in lubricating devices for vehicle axles and other bearings, and the object of the invention is to provide a simple and inexpensive device for lubricating a bearing without removing the revolving member of its retaining means.

According to this invention as exemplified by a vehicle wheel, the axle is provided at the upper surface of the wheel bearing portion with a channel or groove extending from the wheel thrust shoulder to the end of the axle. The depth of this channel being equal to or greater than its width so that a cylindrical tube of the same diameter as the width of the channel and will be level with or slightly below the bearing surface. The floor of the channel may be parallel with the bearing surface or at any desired angle thereto. A cylindrical tube is seated in the channel where it is held by displacing the metal of the axle at suitable points to tightly grip the tube.

In the drawings which illustrate the invention;

Figure 1:
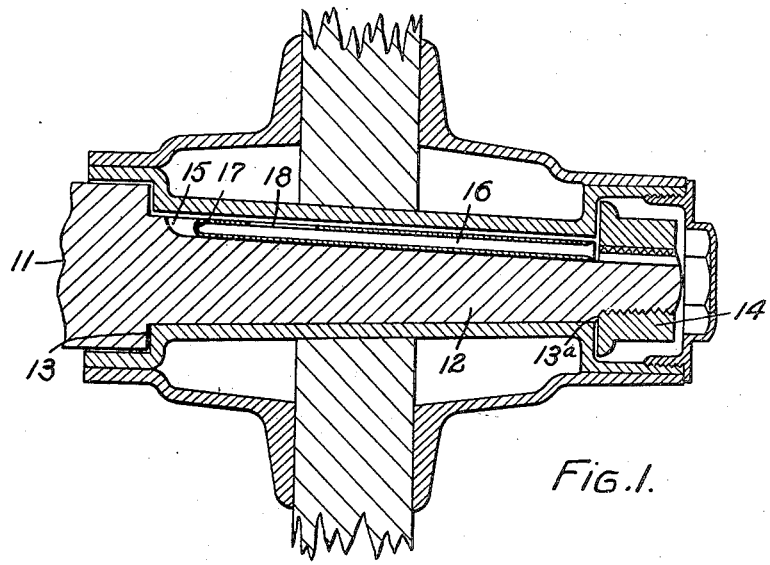
Fig. 1 is a vertical longitudinal section of a portion of a vehicle axle formed according to this invention, and a wheel hub thereon.
Figure 2:
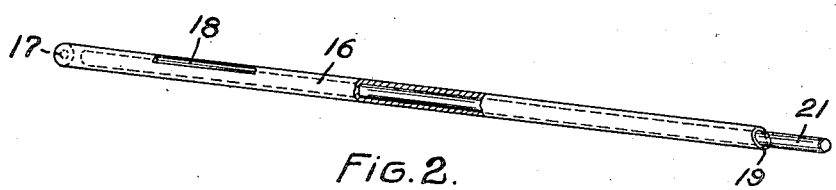
Fig. 2 is a perspective view partly in section of a lubricant tube.
Figure 3:
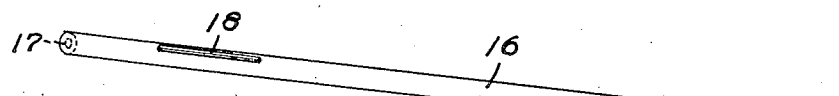
Fig. 3 is a view similar to Figure 2 showing another form of tube.
Figure 5:
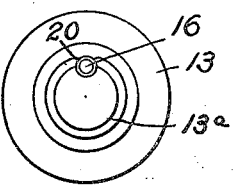
Fig. 5 is an end elevation of the axle.
Figure 4:
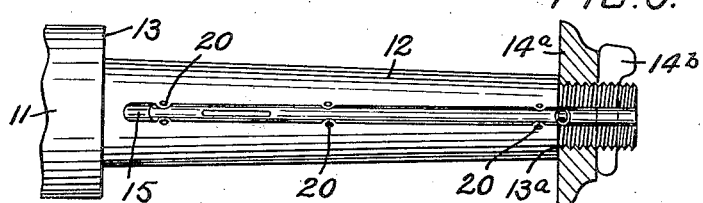
Fig. 4 is a plan view of an axle showing the tube in position and another form of wheel retaining means.

Referring more particularly to the drawings, 11 designates a vehicle axle having a bearing portion 12 separated from the body of the axle by a shoulder 13, and 14 designates a wheel retaining means on the axle, which, while shown as a nut may obviously be any other suitable device, such as a washer 14ª and pin 14ᵇ of Figure 4. A channel 15 is formed longitudinally in the upper part of the bearing portion extending from approximately the shoulder to the end of the axle. The floor of this channel may or may not be parallel with the bearing surface of the axle. A tube 16 is located in the channel and extends from near the inner end of the channel to, or partly into, the wheel retaining means. The inner end of this tube, that is to say, the end adjacent the shoulder is spun or swaged so as to round the end of the tube and provide an opening 17 of smaller diameter than the bore of the tube. The tube is also provided with another opening 18 in the form of a longitudinally disposed slot located adjacent the bearing surface and a short distance from the inner end of the tube. The outer end of the tube may be of a variety of forms. It may be cut off square as shown in Figure 1, or cut obliquely as in Figure 2, or stepped as in Figure 3. In either of these two latter forms a small lip 19 is formed which lies in the bottom of the channel and projects into the wheel retaining means 14 as shown in Figure 4. In any case the outer end of the tube is slightly bell-mouth as shown best in Figure 1. This bell-mouthing does not necessarily mean an increase in the external diameter of the tube as it may be effected by gradually increasing the bore toward the end of the tube.

In order to hold the tube in place in the axle the metal at the edges of the channel is slightly displaced as shown at 20, Figure 4, so as to grip the tube very tightly. This displacing of the metal of the axle may be effected at any suitable point or points in the length of the bearing, or may even be at the shoulder 13ª against which the retaining means 14 abuts. When upsetting the metal of the axle a mandrel 21 is inserted in the tube to support the wall of same so that it will not become dented. The upsetting is preferably effected at points diametrically opposite from one another as clearly shown.

When an axle constructed according to this invention is in use it is possible, owing to the extension of the channel clear to the end of the axle, to get the nozzle of a grease gun or the like into the bell-mouth of the tube without removing the wheel or wheel retaining member. The bell-mouthing of the tube provides an easy lead into the tube so that the end of the tube will not be burred by the careless introduction of an oiling device. The provision of the small aperture 17 at the end of the tube also enables lubricant to be forced through the tube into the channel beyond the end of the tube and also enables the entire length of the tube and the unoccupied inner end of the channel to be cleansed when required by the introduction of a jet of water, steam or air. If the normal lubricant flow aperture 18 should become blocked, the lubricant will find its way out through the aperture 17 into the unoccupied end of the channel and thence to the bearing surface. This unoccupied channel end serves the additional purpose of catching grit which may work past the shoulder 13 so that it does not work far along and score the bearing. The method of securing the tube in place by displacing the metal of the axle may be very quickly and easily performed and will hold the tube in place without the use of additional parts, such as screws or dowel pins which require previous preparation of the axle.

While the invention has been so far described only as applied to vehicle axles, it will be understood that it may be applied to many other types of bearings including shafting, especially where loose pulleys are located. The invention is not limited to cases where the outer member moves around the inner as vehicle wheels, but may be applied in numerous instances where the inner member revolves in a fixed bearing, by merely locating the tube in the fixed bearing.

Having thus described my invention, what I claim is:—

1. In a lubricating device for bearings, a channel in the fixed member of the bearing, a lubricant holding tube located in said channel, and projections from the edges of the channel gripping and holding the tube.

2. In a lubricating device for vehicle wheels, an axle having a bearing portion bounded at one end by a shoulder and at the opposite end by nut receiving threads, said axle being longitudinally grooved from shoulder to threads, and a tube seated in said groove, the tube being enlarged or flared at the end adjacent the threads and having an end opening of less diameter than the bore of the tube at the end adjacent the shoulder and a laterally directed opening adjacent the shoulder end, and a passage giving access to said enlarged tube end.

3. A lubricating device for vehicle axles and the like comprising in combination an axle provided with a bearing portion, a groove of substantially uniform width extending from the inner end of the bearing portion to the outer end of the axle, a tube substantially fitting said groove and fixedly mounted therein with the outer end of said tube being open and directed toward the outer end of the axle, the inner end of said tube being provided with a restricted opening to direct lubricant toward the inner end of said bearing portion and with a suitable opening on the side wall of said tube to direct lubricant laterally from said lubricating opening to said bearing portion.

4. A lubricating device for vehicle axles and the like comprising in combination an axle provided with a bearing portion, a groove of substantially uniform width extending from the inner end of the bearing portion to the outer end of the axle, a tube substantially fitting said groove and fixedly mounted therein by metal from the side wall of said groove which has been forcibly driven inward against said tube and with the outer end of said tube being open and directed toward the outer end of the axle, the inner end of said tube being provided with a restricted opening to direct lubricant toward the inner end of said bearing portion and with a suitable opening on the side wall of said tube to direct lubricant laterally from said lubricating opening to said bearing portion.

5. A lubricating device for vehicle axles and the like comprising in combination an axle provided with a bearing portion, a groove of substantially uniform width extending from the inner end of the bearing portion to the outer end of the axle, a tube substantially fitting said groove and fixedly mounted therein with the outer end of said tube being open and directed toward the outer end of the axle, the inner end of said tube being provided with a restricted opening to direct lubricant toward the inner end of said bearing portion and with a slot on the side wall of said tube to direct lubricant laterally from said lubricating opening to said bearing portion, the side wall of said tube being continuous from said slot to the inner end to hold a supply of lubricant which will be ejected from the end of the tube when a suitable rammer is forced to the inner end of the tube.

6. A lubricating device for vehicle axles and the like comprising an axle provided with a bearing portion having a shoulder adjacent the inner end thereof, a wheel upon said bearing portion, wheel retaining means on the outer end of said bearing portion, said bearing portion being provided on its upper side with a substantially uniform groove extending from adjacent said shoulder to the outer end of the axle, a tube mounted in said groove and below the upper edges of said groove with said tube having an open end extending toward the outer end of the axle and terminating adjacent the wheel retaining means, said tube being slightly less in length than the part of the groove in the bearing portion whereby a space is provided adjacent the inner end of the tube and the end of said groove to provide a receptacle for lubricant adjacent the shoulder of the bearing.

7. An article of manufacture comprising, a tube for lubricating vehicle wheels or the like said tube being adapted to be permanently secured to a suitable vehicle axle and being provided with a restricted opening on one end thereof, another opening in the side wall of said tube and adjacent the end with the restricted opening and with the other end of said tube being unrestricted and comprising a mouth adapted to receive lubricant.

8. An article of manufacture comprising a tube for lubricating vehicle wheels or the like said tube being adapted to be permanently secured to a suitable vehicle axle and being provided with a restricted opening on one end thereof, a slot in the side wall of said tube and adjacent the end with the restricted opening a continuous wall between said slot and the end of the tube, and with the other end of said tube being unrestricted and comprising a mouth adapted to receive lubricant.

9. A device of the class described comprising an axle with a bearing portion, a substantially uniform deep groove extending lengthwise of said bearing portion and leading to the outer end of said axle, a stationary tube fixedly mounted in said groove and provided with lubrication directing openings adjacent the inner end thereof to direct lubricant toward the shoulder of the bearing.

10. A device of the class described comprising an axle with a bearing portion, a substantially uniform deep groove extending lengthwise of said bearing portion and leading to the outer end of said axle, a stationary tube fixedly mounted in said groove and provided with lubrication directing openings adjacent the inner end thereof to direct lubricant toward the shoulder of the bearing, the major portion of said tube extending toward the outer end of the axle being a solid walled tube.

11. A lubricating device for vehicle wheels or the like comprising in combination an axle provided with a tapering bearing portion whereby the upper part of the bearing portion is inclined outwardly and downwardly, a wheel on said bearing portion, said bearing portion being provided with lubrication directing means extending from the outer end of the axle to substantially the shoulder of the bearing to cause lubricant introduced at the outer end of the axle to be ejected adjacent the inner end of the bearing portion without removing the wheel whereby said lubrication will flow by gravity down the inclined portion of the axle toward the outer end thereof.

12. A device of the class described comprising a vehicle axle, a bearing portion on said axle, a shoulder adjacent the inner end of said bearing portion, the outer end of said axle being provided with screw threads adapted to receive a retaining nut, a nut adapted to fit said screw threads, said axle being provided with a groove of substantially uniform width extending from adjacent said shoulder to the outer end of said axle with the base of said groove being substantially straight to provide a lubrication passageway extending outwardly across said screw threads in such manner as to provide an opening in the end of said axle when the nut is in position on the axle whereby lubricant may be introduced from the outer end of the axle to the bearing portion without removing the said nut.

In witness whereof, I have hereunto set my hand.

JAMES J. CARNEY.